United States Patent
Piotrowski et al.

(10) Patent No.: US 10,023,154 B2
(45) Date of Patent: Jul. 17, 2018

(54) UNIVERSAL CONNECTOR FOR ATTACHMENT OF A WINDSHIELD WIPER BLADE WITH MULTIPLE TYPES OF WINDSHIELD WIPER ARMS

(71) Applicant: Illinois Tool Works Inc., Glenview, IL (US)

(72) Inventors: Stanislaw Piotrowski, Addison, IL (US); James C. Fournier, Gurnee, IL (US); Anders Olof Rostlund, Chicago, IL (US); Mark Kurth, Beverly Shores, IN (US); Kenneth H. Teal, Houston, TX (US); Subramaniam Shanmugham, Sugar Land, TX (US); Ashok Darisipudi, Aurora, IL (US)

(73) Assignee: Illinois Tool Works Inc., Glenview, IL (US)

(*) Notice: Subject to any disclaimer, the term of this patent is extended or adjusted under 35 U.S.C. 154(b) by 55 days.

(21) Appl. No.: 15/348,727

(22) Filed: Nov. 10, 2016

(65) Prior Publication Data

US 2017/0072911 A1     Mar. 16, 2017

Related U.S. Application Data

(62) Division of application No. 13/836,333, filed on Mar. 15, 2013, now Pat. No. 9,511,748.

(51) Int. Cl.
*B60S 1/40* (2006.01)

(52) U.S. Cl.
CPC ........... *B60S 1/4003* (2013.01); *B60S 1/4048* (2013.01); *B60S 1/4074* (2013.01); *B60S 2001/408* (2013.01); *B60S 2001/4032* (2013.01); *B60S 2001/4035* (2013.01); *B60S 2001/4051* (2013.01); *B60S 2001/4054* (2013.01)

(58) Field of Classification Search
CPC ..................................................... B60S 1/4003
See application file for complete search history.

(56) References Cited

U.S. PATENT DOCUMENTS

| | | |
|---|---|---|
| 3,588,941 A | 6/1971 | Schlesinger |
| 3,641,614 A | 2/1972 | Newsome |
| 3,757,377 A | 9/1973 | Hayhurst |
| 4,023,232 A | 5/1977 | Smithers |
| 4,057,869 A | 11/1977 | Longman et al. |
| 4,290,164 A | 9/1981 | van den Berg |

(Continued)

FOREIGN PATENT DOCUMENTS

| | | |
|---|---|---|
| CA | 2 835 703 A1 | 11/2012 |
| CN | 2188518 Y | 2/1995 |

(Continued)

OTHER PUBLICATIONS

U.S. Appl. No. 14/643,255, filed Mar. 10, 2015, Lepper et al.

(Continued)

*Primary Examiner* — Andrew A Horton
(74) *Attorney, Agent, or Firm* — Brinks, Gilson & Lione (57) ABSTRACT

A connector for connecting a wiper blade and multiple types of wiper arms, the connector including a base for attachment to a wiper blade. The connector further includes a receiving element attached to the base, the receiving element having a structure to receive and be connected to at least six different wiper arms.

22 Claims, 10 Drawing Sheets

(56) References Cited

U.S. PATENT DOCUMENTS

| | | |
|---|---|---|
| 4,321,725 A | 3/1982 | Journee |
| 4,450,602 A | 5/1984 | Maiocco |
| 4,967,438 A | 11/1990 | Arai et al. |
| 5,084,933 A | 2/1992 | Buechele |
| 5,136,748 A | 8/1992 | Naruke et al. |
| 5,289,608 A | 3/1994 | Kim |
| 5,332,328 A | 7/1994 | Yang |
| 5,392,487 A | 2/1995 | Yang |
| 5,606,765 A | 3/1997 | Ding |
| 5,618,124 A | 4/1997 | Chen |
| 5,920,950 A | 7/1999 | Young, III et al. |
| 5,970,569 A | 10/1999 | Merkel et al. |
| 6,055,697 A | 5/2000 | Wollenschlaeger |
| 6,192,546 B1 | 2/2001 | Kotlarski |
| 6,202,251 B1 | 3/2001 | Kotlarski |
| 6,209,166 B1 | 4/2001 | Westermann et al. |
| 6,263,538 B1 | 7/2001 | Westermann et al. |
| 6,301,741 B1 | 10/2001 | Westermann et al. |
| 6,675,432 B1 | 1/2004 | De Block |
| 6,687,948 B2 | 2/2004 | Kotlarski |
| 6,779,223 B1 | 8/2004 | Roekens |
| 7,028,368 B2 | 4/2006 | Lee et al. |
| 7,055,207 B2 | 6/2006 | Coughlin |
| 7,159,267 B2 | 1/2007 | Son |
| 7,287,296 B2 | 10/2007 | Vacher |
| 7,305,734 B2 | 12/2007 | Boland et al. |
| 7,341,396 B2 | 3/2008 | Huang |
| 7,350,259 B2 | 4/2008 | Walworth et al. |
| 7,421,755 B2 | 9/2008 | Kinoshita et al. |
| 7,434,291 B2 | 10/2008 | Chiang |
| 7,506,401 B2 | 3/2009 | Park |
| 7,581,279 B2 | 9/2009 | Baseotto et al. |
| 7,587,782 B2 | 9/2009 | Inoue |
| 7,607,194 B2 | 10/2009 | Weber et al. |
| 7,621,016 B2 | 11/2009 | Verelst et al. |
| 7,634,833 B2 | 12/2009 | Boland |
| 7,669,276 B2 | 3/2010 | Verelst et al. |
| 7,669,277 B2 | 3/2010 | Inoue |
| 7,716,780 B2 | 5/2010 | Scholl et al. |
| 7,823,247 B2 | 11/2010 | Poton |
| 7,827,652 B2 | 11/2010 | Yang et al. |
| 7,886,401 B2 | 2/2011 | Weber et al. |
| 7,891,044 B2 | 2/2011 | Fink et al. |
| 7,908,703 B2 | 3/2011 | Van Bealen |
| 7,937,798 B2 | 5/2011 | Fink et al. |
| 7,950,101 B2 | 5/2011 | Kim |
| 7,979,950 B2 | 7/2011 | Boland |
| 8,069,528 B2 | 12/2011 | Verelst et al. |
| 8,191,201 B2 | 6/2012 | De Block et al. |
| 8,220,106 B2 | 7/2012 | Fink et al. |
| 8,230,547 B2 | 7/2012 | Wilms et al. |
| 8,261,403 B2 | 9/2012 | Ehde |
| 8,286,298 B2 | 10/2012 | Kim |
| 8,370,986 B2 | 2/2013 | Wilms et al. |
| 8,397,341 B2 | 3/2013 | Ehde |
| 8,479,349 B2 | 7/2013 | Boland et al. |
| 8,479,350 B2 | 7/2013 | Kim et al. |
| 8,484,794 B2 | 7/2013 | Westermann et al. |
| 8,490,239 B2 | 7/2013 | Ehde |
| 8,505,151 B2 | 8/2013 | Depondt et al. |
| 8,505,152 B2 | 8/2013 | Boland |
| 8,544,137 B2 | 10/2013 | Thienard |
| 8,549,696 B2 | 10/2013 | Boland et al. |
| 8,555,456 B2 | 10/2013 | Ehde |
| 8,595,889 B2 | 12/2013 | Op't Roodt et al. |
| 8,615,841 B2 | 12/2013 | Kim et al. |
| 8,719,994 B2 | 5/2014 | Thienard et al. |
| D727,238 S | 4/2015 | Lepper et al. |
| 9,511,748 B2 | 12/2016 | Piotrowski et al. |
| 9,555,775 B2 | 1/2017 | Fournier et al. |
| 2002/0192017 A1 | 12/2002 | Rosenstein et al. |
| 2003/0066153 A1 | 4/2003 | Rosenstein et al. |
| 2004/0123414 A1 | 7/2004 | Lee |
| 2005/0091793 A1 | 5/2005 | Huang |
| 2006/0059647 A1 | 3/2006 | Ostrowski |
| 2006/0207050 A1 | 9/2006 | Shanmugham et al. |
| 2007/0226940 A1 | 10/2007 | Thienard |
| 2008/0058195 A1 | 3/2008 | Chiang |
| 2008/0289133 A1* | 11/2008 | Kim ................... B60S 1/387 |
| | | 15/250.32 |
| 2009/0151110 A1 | 6/2009 | Ku |
| 2009/0199357 A1 | 8/2009 | Thienard |
| 2009/0307862 A1 | 12/2009 | Boland |
| 2010/0005609 A1 | 1/2010 | Kim |
| 2010/0024149 A1 | 2/2010 | Erdal |
| 2010/0050361 A1 | 3/2010 | Chang et al. |
| 2010/0146727 A1 | 6/2010 | Coemans et al. |
| 2010/0186185 A1 | 7/2010 | Grasso et al. |
| 2010/0205763 A1 | 8/2010 | Ku |
| 2011/0005020 A1 | 1/2011 | Koppen et al. |
| 2011/0056041 A1 | 3/2011 | Wu |
| 2011/0056042 A1 | 3/2011 | Fink et al. |
| 2011/0072607 A1 | 3/2011 | Van Baelen et al. |
| 2011/0113583 A1 | 5/2011 | Shanmugham et al. |
| 2011/0247166 A1 | 10/2011 | Depondt et al. |
| 2012/0047673 A1 | 3/2012 | Depondt |
| 2012/0060315 A1 | 3/2012 | Avasiloaie et al. |
| 2012/0060316 A1 | 3/2012 | Avasiloaie et al. |
| 2012/0110772 A1 | 5/2012 | Boland |
| 2012/0110773 A1 | 5/2012 | Thielen et al. |
| 2012/0144615 A1 | 6/2012 | Song et al. |
| 2012/0180244 A1 | 7/2012 | Kim et al. |
| 2012/0227206 A1 | 9/2012 | Depondt |
| 2012/0233801 A1 | 9/2012 | Coart et al. |
| 2012/0233802 A1 | 9/2012 | Depondt |
| 2012/0246859 A1 | 10/2012 | Schaeuble et al. |
| 2012/0246860 A1 | 10/2012 | Schaeuble et al. |
| 2012/0260450 A1 | 10/2012 | Fink et al. |
| 2012/0279008 A1 | 11/2012 | Depondt |
| 2013/0007977 A1 | 1/2013 | Depondt |
| 2013/0045332 A1 | 2/2013 | Fang et al. |
| 2013/0067674 A1 | 3/2013 | Chiang |
| 2013/0104334 A1 | 5/2013 | Depondt |
| 2013/0117956 A1 | 5/2013 | Chien |
| 2013/0125331 A1 | 5/2013 | Genet |
| 2013/0152323 A1 | 6/2013 | Chien |
| 2013/0152330 A1 | 6/2013 | Kim et al. |
| 2013/0167317 A1 | 7/2013 | Oslizlo et al. |
| 2013/0180072 A1 | 7/2013 | Boland |
| 2013/0255026 A1 | 10/2013 | Depondt |
| 2013/0305476 A1 | 11/2013 | Smets et al. |
| 2013/0312209 A1 | 11/2013 | Genet |
| 2013/0333145 A1 | 12/2013 | Depondt |
| 2013/0340194 A1 | 12/2013 | Depondt |
| 2013/0343811 A1 | 12/2013 | Depondt |
| 2014/0041143 A1 | 2/2014 | Kim et al. |
| 2014/0068887 A1 | 3/2014 | Lee |
| 2014/0123426 A1 | 5/2014 | Lee |
| 2014/0165321 A1 | 6/2014 | Depondt |
| 2014/0182075 A1 | 7/2014 | Polocoser et al. |
| 2014/0259504 A1 | 9/2014 | Piotrowski et al. |
| 2014/0259505 A1 | 9/2014 | Fournier et al. |
| 2014/0262863 A1 | 9/2014 | Fournier et al. |
| 2015/0258967 A1 | 9/2015 | Lepper et al. |

FOREIGN PATENT DOCUMENTS

| | | |
|---|---|---|
| CN | 2200568 Y | 6/1995 |
| CN | 102958765 A | 3/2013 |
| DE | 20 2009 013 452 U1 | 1/2010 |
| DE | 10 2010 030 880 A1 | 1/2012 |
| DE | 20 2012 100 430 U1 | 5/2012 |
| DE | 20 2012 102614 U1 | 10/2012 |
| DE | 10 2011 079 783 A1 | 1/2013 |
| EP | 1 347 895 B1 | 8/2005 |
| EP | 1 403 156 B1 | 12/2008 |
| EP | 2 360 070 A1 | 8/2011 |
| EP | 1 625 056 B1 | 2/2016 |
| FR | 2 533 517 A1 | 3/1984 |
| FR | 2 865 699 B1 | 9/2007 |
| FR | 2 890 925 B1 | 12/2009 |
| FR | 2 896 746 B1 | 1/2010 |
| FR | 2 926 514 B1 | 6/2010 |
| GB | 1 535 122 A | 12/1978 |

(56) References Cited

FOREIGN PATENT DOCUMENTS

| | | | |
|---|---|---|---|
| GB | 2 332 140 A | 6/1999 | |
| JP | 4215651 B2 | 1/2009 | |
| JP | 4260745 B2 | 4/2009 | |
| JP | 2010-83183 A | 4/2010 | |
| JP | 4870353 B2 | 2/2012 | |
| JP | 4972089 B2 | 7/2012 | |
| JP | 5189476 B2 | 4/2013 | |
| JP | 5335133 B2 | 11/2013 | |
| JP | 5352055 B2 | 11/2013 | |
| JP | 5377772 B2 | 12/2013 | |
| KR | 2001-0058909 A | 7/2001 | |
| KR | 10-824034 B1 | 4/2008 | |
| KR | 10-2009-085357 A | 8/2009 | |
| KR | 10-2009-100975 A | 9/2009 | |
| KR | 10-0932745 B1 | 12/2009 | |
| KR | 10-2010-023942 A | 3/2010 | |
| KR | 10-959035 B1 | 5/2010 | |
| KR | 10-0961622 B1 | 6/2010 | |
| KR | 20-2010-005707 U | 6/2010 | |
| KR | 10-2011-000855 A | 1/2011 | |
| KR | 10-1027384 B1 | 3/2011 | |
| KR | 10-2011-036182 A | 4/2011 | |
| KR | 10-2011-0116521 A | 10/2011 | |
| KR | 102012-029616 A | 3/2012 | |
| KR | 10-1158370 B1 | 6/2012 | |
| KR | 10-1189722 B1 | 10/2012 | |
| KR | 10-1198352 B1 | 11/2012 | |
| KR | 10-1285317 B1 | 7/2013 | |
| WO | WO 2005/082692 A1 | 9/2005 | |
| WO | WO 2009/155230 A1 | 12/2009 | |
| WO | WO 2011/032760 A1 | 3/2011 | |
| WO | WO 2012/103944 A1 | 8/2012 | |
| WO | WO 2013/019645 A1 | 2/2013 | |
| WO | WO 2013/019723 A1 | 2/2013 | |
| WO | WO 2013/176352 A1 | 11/2013 | |

OTHER PUBLICATIONS

U.S. Appl. No. 15/211,611, filed Jul. 15, 2016, Rosas et al.
U.S. Appl. No. 15/400,742, filed Jan. 6, 2017, Fournier et al.
Search Report and Written Opinion for corresponding Patent Cooperation Treaty patent application PCT/US2014/016738.
English language translation of German reference 20 2012 102 614 generated by European Patent Office dated Dec. 14, 2015, pp. 1-12.
International Search Report and Written Opinion for PCT application No. PCT/US2014/016732 dated Nov. 6, 2014.
FR2533517A (machine translation), published by European Patent Office dated Jul. 15, 2015, pp. 1-7.
Office Action for corresponding Chinese Patent Application No. 201480027119.6 dated Aug. 30, 2016, 7 pages.

\* cited by examiner

Large Pin

Fig. 8A (2)

Small Pin

Fig. 8B

Push Tab Button (PTB)

Fig. 8C

Insert & Lock (I & L)

Fig. 8D (1)

Large J-Hook

Fig. 8D (2)

Small J-Hook

UNIVERSAL CONNECTOR FOR ATTACHMENT OF A WINDSHIELD WIPER BLADE WITH MULTIPLE TYPES OF WINDSHIELD WIPER ARMS

This application is a divisional application of application Ser. No. 13/836,333, filed Mar. 15, 2013, (now pending), the entire contents of which are incorporated herein by reference.

BACKGROUND

1. Technical Field

The present invention relates to a universal connector for attachment of a windshield wiper blade with multiple types of windshield wiper arms.

2. Background Information

Automobiles use a variety of wiper arms to move a wiper blade. Since wiper blades need to be replaced periodically, a potential buyer of a wiper blade often has difficulty in identifying a wiper blade displayed in a store that can be attached with the wiper arm of his or her automobile. In the past, this situation has been addressed by supplying multiple connectors in either separate packages or with the wiper blade itself so that the consumer can match the appropriate connector with the wiper arm of the consumer's automobile. This practice can be cumbersome in that the consumer has to deal with multiple connectors. Furthermore, the connectors often come as multiple pieces which can be easy to lose. In addition, there may be situations where the connectors purchased are not appropriate for attachment to the consumer's wiper arm.

BRIEF SUMMARY OF THE INVENTION

One aspect of the present invention regards a connector for connecting a wiper blade and multiple types of wiper arms, the connector including a base for attachment to a wiper blade. The connector further includes a receiving element attached to the base, the receiving element having a structure to receive and be connected to at least six different wiper arms.

A second aspect of the present invention regards a windshield wiper that includes a wiper blade, a wiper arm and a connector. The connector includes a base attached to the wiper blade and a receiving element attached to the base and the wiper arm. The receiving element has a structure to receive and be connected to at least five different wiper arms besides the wiper arm to which the receiving element is connected.

A third aspect of the present invention regards a connector for connecting a wiper blade and a wiper arm. The connector includes a base for attachment to a wiper blade and a receiving element pivotably attached to the base. The receiving element includes an attachment that pivotably couples the receiving element to the base and a recess structured to receive a wiper arm. The connector further including a pivot stop that is positioned adjacent to the recess, wherein when the wiper arm is received by the recess, the pivot stop engages the wiper arm and prevents the receiving element from pivoting relative to the base.

A fourth aspect of the present invention regards a windshield wiper that includes a wiper blade, a wiper arm and a connector. The connector includes a base for attachment to the wiper blade and a receiving element pivotably attached to the base. The receiving element includes an attachment that pivotably couples the receiving element to the base and a recess structured to receive the wiper arm. The connector further includes a pivot stop that is positioned adjacent to the recess, wherein when the wiper arm is received by the recess, the pivot stop engages the wiper arm and prevents the receiving element from pivoting relative to the base.

A fifth aspect of the invention regards a connector for connecting a wiper blade and a wiper arm. The connector includes a base for attachment to a wiper blade and a receiving element attached to the base. The receiving element includes a support surface and an engagement surface spaced from and facing the support surface. The engagement surface and the support surface define a slot dimensioned to snugly receive a surface of a wiper arm. The engagement surface includes a first side support, a second side support that faces the first side support, and an engagement tongue. In addition, one end of the engagement tongue is attached to both the first side support and the second side support and an opposite end of the engagement tongue is unattached and has a protrusion that faces the support surface.

A sixth aspect of the present invention regards a windshield wiper that includes a wiper blade, a wiper arm, and a connector. The connector includes both a base for attachment to the wiper blade and a receiving element attached to the base. The receiving element including a support surface and an engagement surface spaced from and facing the support surface, wherein the engagement surface and the support surface define a slot dimensioned to snugly receive a surface of the wiper arm. The engagement surface includes a first side support, a second side support that faces the first side support, and an engagement tongue. In addition, one end of the engagement tongue is attached to both the first side support and the second side support and an opposite end of the engagement tongue is unattached and has a protrusion that faces the support surface and engages the wiper arm.

A seventh aspect of the present invention regards a connector for connecting a wiper blade and a wiper arm. The connector includes a base for attachment to a wiper blade and a receiving element pivotably attached to the base. The receiving element includes an attachment that pivotably couples the receiving element to the base, and a recess structured to receive a first wiper arm. The connector further includes a pivot stop that is positioned adjacent to the recess, wherein when the first wiper arm is received by the recess, the pivot stop engages the first wiper arm and prevents the receiving element from pivoting relative to the base. The connector further including a support surface having a pair of flexible wing stops that face one another and can be pressed towards one another, and an engagement surface spaced from and facing the support surface. The engagement surface and the support surface define a slot dimensioned to snugly receive a surface of a second wiper arm. The engagement surface includes a first side support, a second side support that faces the first side support, and an engagement tongue. In addition, one end of the engagement tongue is attached to both the first side support and the second side support and an opposite end of the engagement tongue is unattached and has a protrusion that faces the support surface.

An eighth aspect of the present invention regards a windshield wiper that includes a wiper blade, a wiper arm and a connector. The connector is attached to the wiper arm and includes a base attached to the wiper blade and a receiving element pivotably attached to the base. The receiving element includes an attachment that pivotably couples the receiving element to the base and a recess structured to receive a first wiper arm. The connector further includes a pivot stop that is positioned adjacent to the recess, wherein when the first wiper arm is received by the recess, the pivot stop engages the first wiper arm and prevents the receiving element from pivoting relative to the base. The connector further including a support surface having a pair of flexible wing stops that face one another and can be pressed towards one another, and an engagement surface spaced from and facing the support surface. The flexible engagement surface and the support surface define a slot dimensioned to snugly receive a surface of a second wiper arm. The engagement surface includes a first side support, a second side support that faces the first side support, and an engagement tongue. In addition, one end of the engagement tongue is attached to both the first side support and the second side support and an opposite end of the engagement tongue is unattached and has a protrusion that faces the support surface.

One or more aspects of the present invention provide the advantage of providing the possibility of attaching a wiper blade to multiple wiper arms by using just a single connector.

One or more aspects of the present invention provide the advantage of providing the possibility of attaching a wiper blade to multiple wiper arms with a connector of a single piece construction.

The accompanying drawings, which are incorporated herein and constitute part of this specification, and, together with the general description given above and the detailed description given below, serve to explain features of the present invention.

BRIEF DESCRIPTION OF THE DRAWING

In the drawings:

FIG. 13A shows a side view of the connector of FIGS. 1A-C attached to a J-hook wiper arm;

FIG. 13B shows a top view of the connector and J-hook wiper arm of FIG. 13A;

FIG. 13C shows a cross-sectional view of the connector and J-hook wiper arm of FIG. 13A taken along line B-B of FIG. 13A;

FIG. 13D shows a cross-sectional view of the connector and J-hook wiper arm of FIG. 13A taken along line A-A of FIG. 13A FIG. 13 E schematically shows a front cross-sectional view of (Original) The connector of FIGS. 13A-C when the J-hook of FIG. 8D with the small width is attached;

DETAILED DESCRIPTION OF THE PREFERRED EMBODIMENTS

FIGS. 1A-C, 2-7, 14, and 15A-B show a connector 100 for connecting a wiper blade and multiple types of wiper arms. The connector 100 includes a base 102 that is used to attach the connector 100 to a wiper blade. In particular, the underside of the base 102 includes flexible fingers that engage a bracket positioned in the central portion of the wiper blade. An example of a possible wiper blade for the connector 100 to be attached to is the wiper blade sold under the name Latitude and distributed under the Rain-X trademark by ITW Global Brands. Note that the base 102 can be revised so as to allow attachment to other types of wiper blades, such as wiper blades made by ADM21 Co., LTD., Anco, Bosch, Corea Autoparts Producing Corp., KCW Corporation, Proline, Trico and Valeo.

Figure 1A:
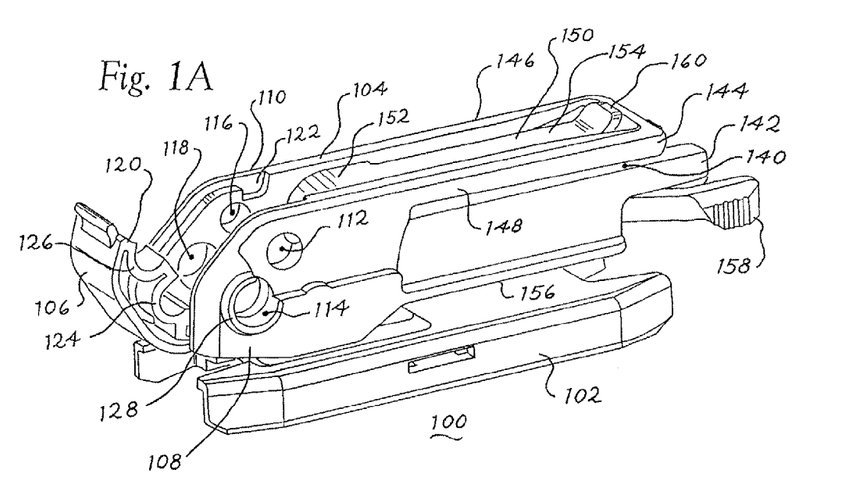
FIG. 1A shows a perspective view of an embodiment of a connector for connecting a wiper blade and multiple types of wiper arms, wherein the cap is opened.
Figure 1B:
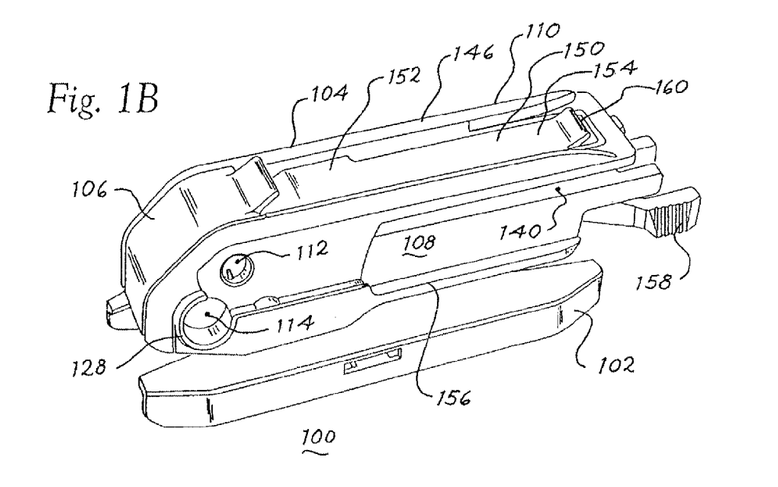
FIG. 1B shows a perspective view of the connector of FIG. 1A when the cap is closed.
Figure 1C:
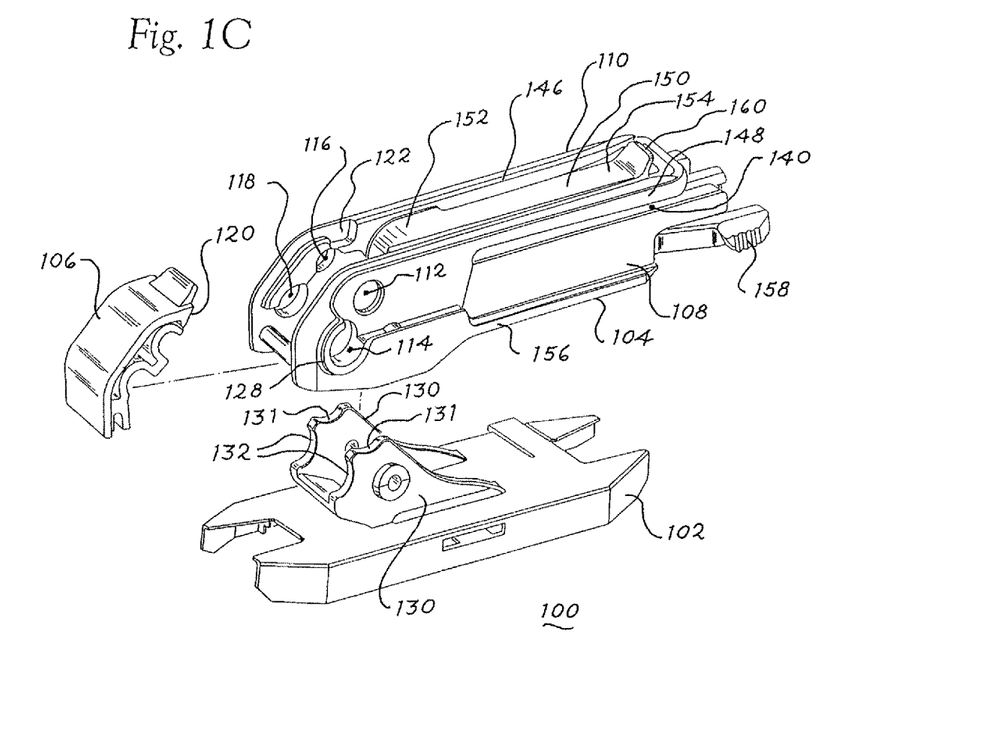
FIG. 1C shows an exploded view of the connector of FIG. 1A.
Figures 2, 3:
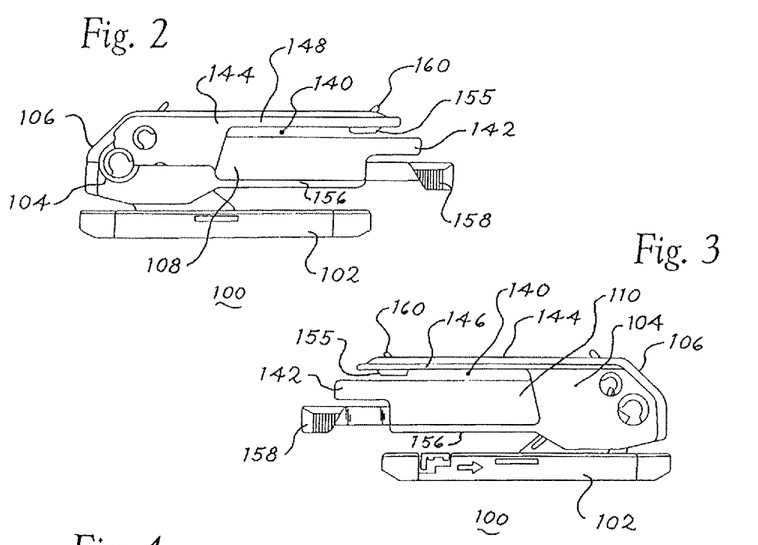
FIG. 2 shows a left side view of the connector of FIG. 1B.
FIG. 3 shows a right side view of the connector of FIG. 1B.
Figures 4, 5, 6, 7:
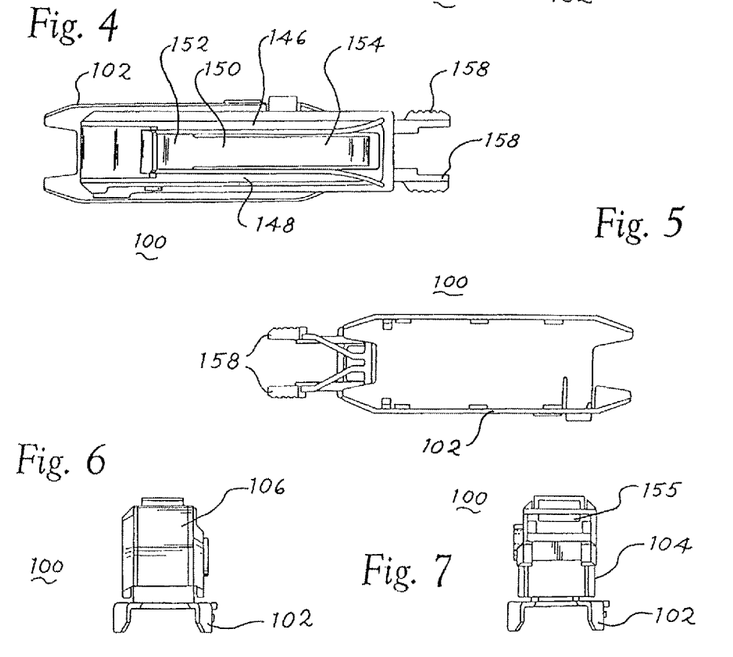
FIG. 4 shows a top view of the connector of FIG. 1B.
FIG. 5 shows a bottom view of the connector of FIG. 1B.
FIG. 6 shows a front view of the connector of FIG. 1B.
FIG. 7 shows a rear view of the connector of FIG. 1B.

The connector 100 includes a receiving element 104 that is pivotably attached to a top portion of the base 102. In particular, the receiving element 104 has a pair of pins (not shown) facing one another on the interior surfaces of opposing side walls 108, 110 of the receiving element 104. The pins are inserted into holes 105 of adjacent pivot stops 130 that are integral with the base 102. Thus, the receiving element 102 is able to pivot about the pins. As shown in FIG. 1C, the base 102 is integrally attached to a pair of pivot stops 130 that face one another and are parallel to one another. The pivot stops 130 are identical in shape and are positioned so that their indents 131 and 133 are aligned with and are adjacent to the bottom edges of the recesses 112, 114, 116 and 118.

Figure 8A:
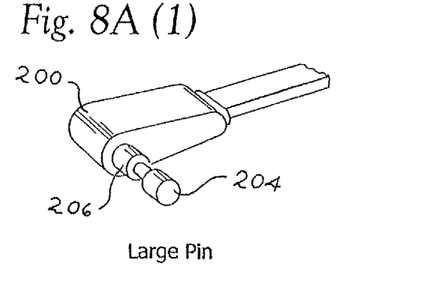
FIGS. 8A-D show three possible classes of connectors of wiper arms that can be attached to the connector of FIGS. 1A-C.

As will be explained hereafter, the receiving element 104 has a structure to receive and be connected to at least six different wiper arms, which are defined to be in at least three different classes of wiper arms. One class of wiper arms that the connector 100 can be attached is pin arm wiper arms of which pin wiper arms 200, 202 are an example thereof, wherein proximal ends of such pin arm wiper arms are shown in FIG. 8A (1)-(2). For such attachment, a locking cap or cover 106 is pivoted to an open position as shown in FIG. 1A. Pivoting of the locking cap 106 is accomplished by a pair of pins (not shown) that face opposite one another at a lower end of the locking cap 106. The pins are inserted into corresponding openings formed in the interior surfaces of opposing side walls 108 and 110 of the receiving element 104. Thus, the locking cap 106 pivots about an axis aligned with the pins from the open position shown in FIG. 1A to a closed position shown in FIG. 1B.

With the locking cap 106 in the open position, a pin wiper arm can be attached to the connector 100 via receiving element 104. The connector 100 can accommodate multiple sizes of pin arms, such as the small and large wiper pins 200, 202 of FIG. 8A (1)-(2). This is accomplished in part by forming a pair of recesses or openings 112 and 114 in side wall 108 and oppositely facing and identically sized recesses or openings 116 and 118 formed in the side wall 110. The upper recesses 112 and 116 have a diameter so as to correspond to the diameter of the distal portion of a small pin wiper arm 202. Similarly, the lower recesses 114 and 118 have a diameter so as to correspond to the diameter of the distal portion of a large pin wiper arm 200.

Figure 9A:
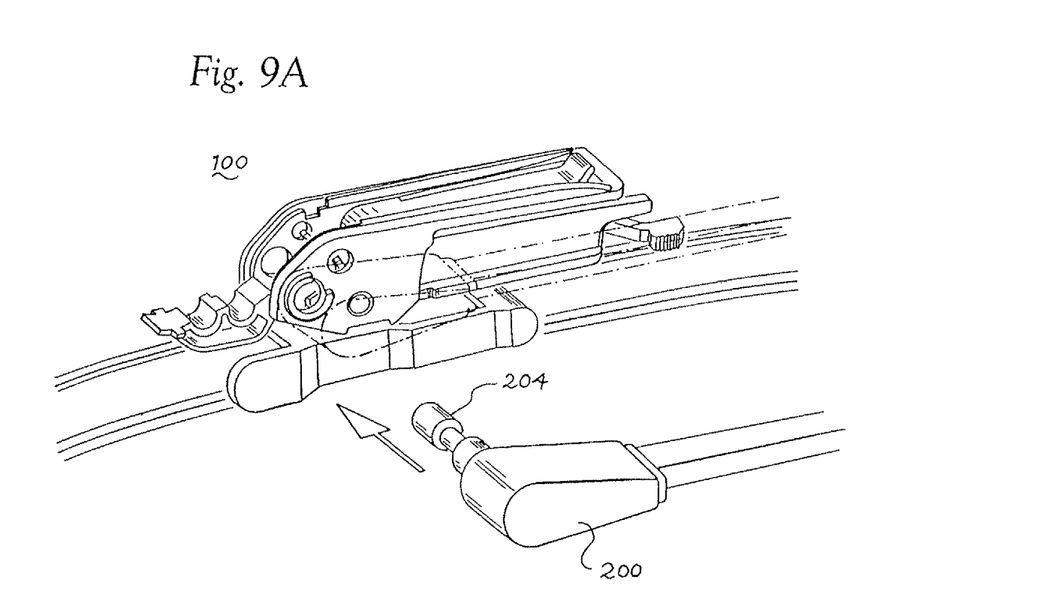
FIGS. 9A-B show a possible way of attaching a pin wiper arm to the connector of FIGS. 1A-C.
Figure 9B:
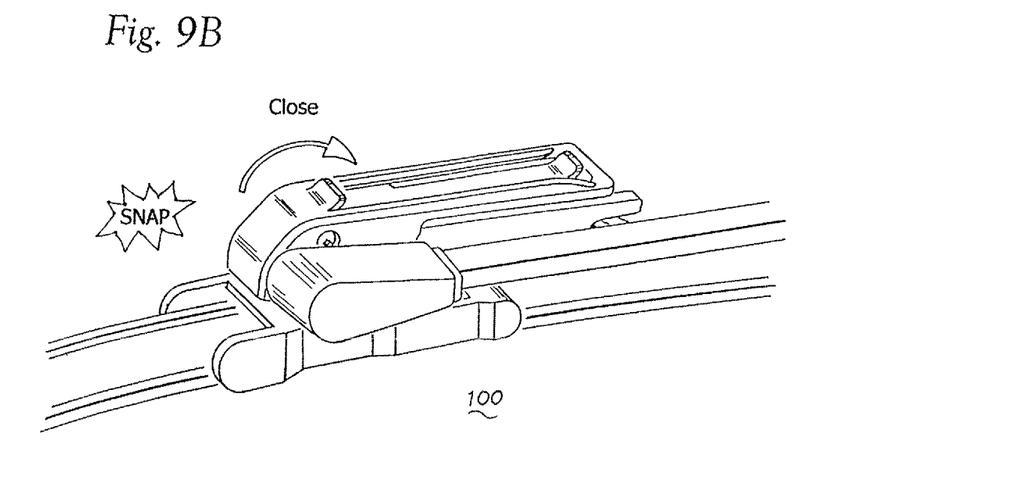

Attachment of either the large pin wiper arm 200 or the small pin wiper arm 202 is accomplished in a similar manner. In the case of attachment of the large pin wiper arm 200, the distal end 204 is aligned with the recess 114 as shown in FIG. 9A. Next, the distal end 204 is inserted through the recess 114 until the distal end 204 is received within recess 118 and extends slightly past the exterior of side wall 110. At this position, the locking cap 106 is pivoted to the closed position of FIG. 1B, wherein side protrusions 120 (see FIGS. 1A and 1C) of the locking cap 106 engage indents 122 (see FIGS. 1A and 1C) formed in the side walls 108 and 110. Engagement in the indents 122 by the side protrusions 120 causes a snapping sound as shown in FIG. 11B, which signals that the pin wiper arm is locked into attachment with the connector 100. Note that in the closed position, a c-shaped indent or surface 124 of locking cap 106 engages the middle portion 206 of the pin wiper arm 200 and presses the pin wiper arm 200 in general against the edges of the recesses 114 and 118. The c-shaped indent or surface 124 preferably has a shape that corresponds to the shape of the middle portion 206. Removal of the pin wiper arm 200 is accomplished by moving the locking cap 106 to the open position of FIG. 1A and pulling the distal end of the pin wiper arm 202 through the recesses 114 and 118.

In a manner similar to that described above with respect to large pin wiper arm 200, when the small pin wiper arm 202 is attached via insertion through recesses 112, 116, a smaller c-shaped surface 126 of locking cap 106 engages a middle portion of the pin wiper arm 202 when locking cap 106 is closed. Removal of the pin wiper arm 202 is accomplished by moving the locking cap 106 to the open position of FIG. 1A and pulling the distal end of the pin wiper arm 202 through the recesses 112 and 116.

Note that the receiving element 104 includes a c-shaped collar 128 that extends away from the recess 114 and side wall 108 so as to prevent the distal end 204 from extending too much past the recess 118 and exterior of side wall 110.

As mentioned previously, moving the cover cap 106 to the closed position locks the pin wiper arm into position. It should be pointed out that during the insertion of the pin wiper arm 200, 202 into the receiving element 104, the distal end of pin wiper arm 200, 202 engages either indents 131 or indents 133 of pivot stop 130 that are positioned within the interior of the receiving element 104. Such engagement depends on whether the pin wiper arm is inserted into recesses 112, 116 or recesses 114, 118. In addition, simultaneous engagement of the pin wiper arm to the recesses and the indents prevents the receiving element 104 from pivoting relative to the base 102.

Figures 8B, 8C:
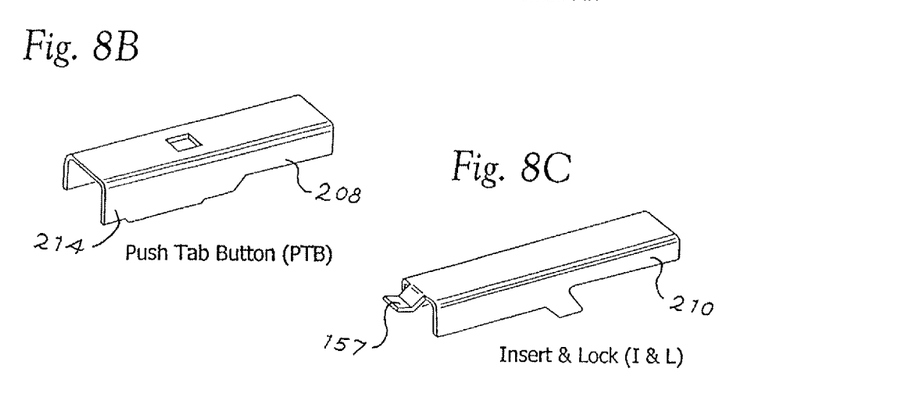
Figure 10A:
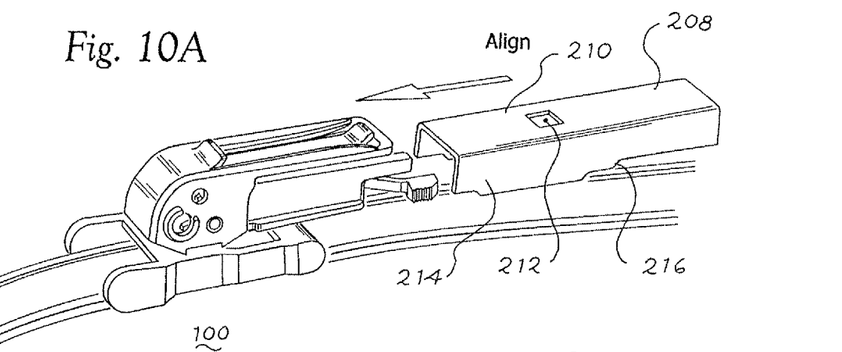
FIGS. 10A-C show a possible way of attaching a type of channel wiper arm, commonly known as a push tab button (PTB) wiper arm, to the connector of FIGS. 1A-C.
Figure 10B:
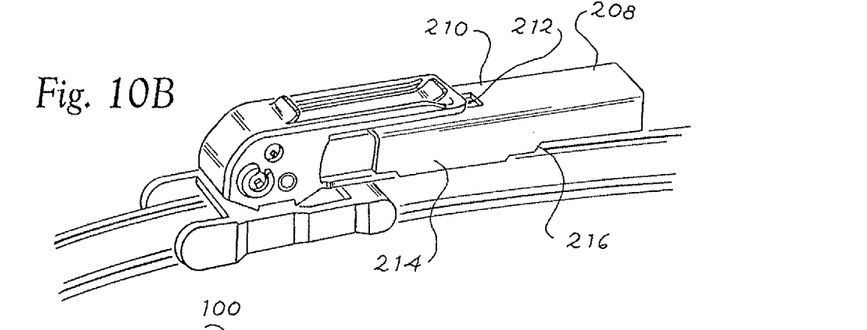

A second class of wiper arms that the connector 100 can be attached is channel arm types of wiper arms, wherein examples of such a class are the push tab button (PTB) wiper arm 208 shown in FIG. 8B and the insert & lock (I & L) wiper arm 210 shown in FIG. 8C. In the case of the PTB wiper arm 208, the entire wiper arm 208 is aligned with a slot 140 (see FIG. 10A) that is defined by the space between a support surface 142 of the receiving element 104 and an engagement surface 144 that is spaced apart from and facing the support surface 142. The slot 140 is dimensioned to snugly receive a top surface 210 of the aligned distal end of the PTB wiper arm 208 that is inserted into the slot 140 as shown in FIG. 10B. As shown in FIGS. 1A-B, the engagement surface 144 includes a first side support 146 and a second side support 148 that faces the first side support 146. The engagement surface 144 further includes an engagement tongue 150, wherein one end 152 of the engagement tongue 150 is attached to both side supports 146, 148 and an opposite end 154 of the engagement tongue 150 is unattached and has a protrusion 155 (see FIGS. 2-3 and 7) on the bottom surface of the engagement tongue 150 that faces the support surface 142. The first side support 146 and the second side support 148 move independently of the engagement tongue 150 and vice versa.

Figure 14:
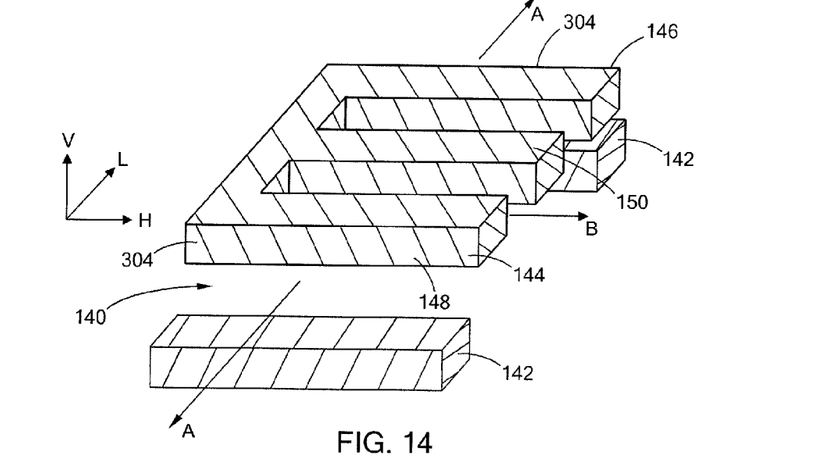
FIG. 14 schematically shows an enlarged schematic and perspective view of a portion of the slot formed in (Original) The connector of FIGS. 1-7.
Figure 15A:
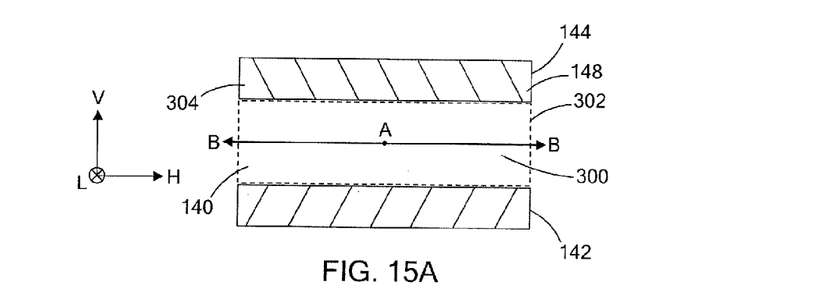
FIG. 15A shows a side view of the portion of the slot of FIG. 14.
Figure 15B:
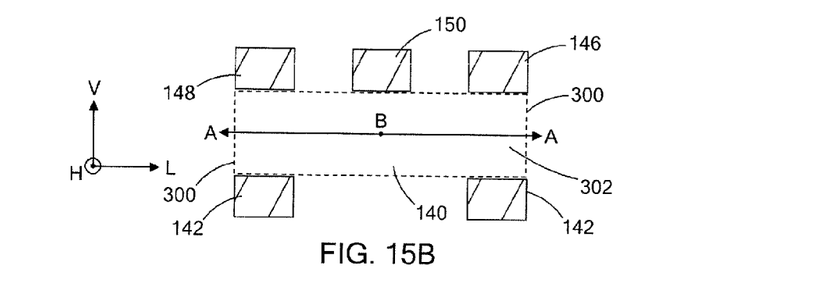
FIG. 15B shows a rear view of the portion of the slot of FIG. 14.

FIG. 14 shows an enlarged, schematic view of the receiving element 104, wherein at a right side of the figure a cross-sectional view is shown as defined by an imaginary vertical plane that intersects rear portions of the engagement surface 144 and the support surface 142. As shown in FIGS. 14 and 15A-B, the slot 140 is positioned between the support surface 142 and the engagement surface 144, wherein the engagement surface 144 is spaced from and faces the support surface 142 as viewed along a vertical direction V. The engagement surface 144 is substantially parallel to the support surface 142 along an entire length of the engagement surface 144. The vertical direction V is the same direction at which the receiving element 104 is arranged above the base 102. The slot 140 extends along a length of the engagement surface 144 as viewed along a horizontal direction H that is perpendicular to the vertical direction V. In addition, the slot 140 includes a side opening 300 defined by the support surface 142 and the engagement surface 144, wherein the side opening 300 (see dashed lines in FIG. 15A) is unencumbered by any portion of the receiving element 104 when an axis A, which has no end points and is parallel to a lateral direction L that is perpendicular to both the vertical direction V and the horizontal direction H, passes through the side opening 300 and does not intersect the receiving element 104 in any way. Furthermore, the slot 140 has a rear opening 302 (see dashed lines in FIG. 15B) that is defined by side supports 146, 148, engagement tongue 150, and support surface 142. Note that in FIGS. 15A-B, a dot indicates an axis coming out of the page and a circle with an "x" inside indicates an axis going into the page. The opening 302 is intersected by an axis B that is perpendicular to the opening 302 and intersects with and is perpendicular to axis A. From axis A, axis B extends through the rear portion of the slot 140 (see FIG. 14) without intersecting the receiving element 104 in any way. Thus, the slot 140 defines left and right side openings 300 and a rear opening 302 for the receiving element 104.

Figure 10C:
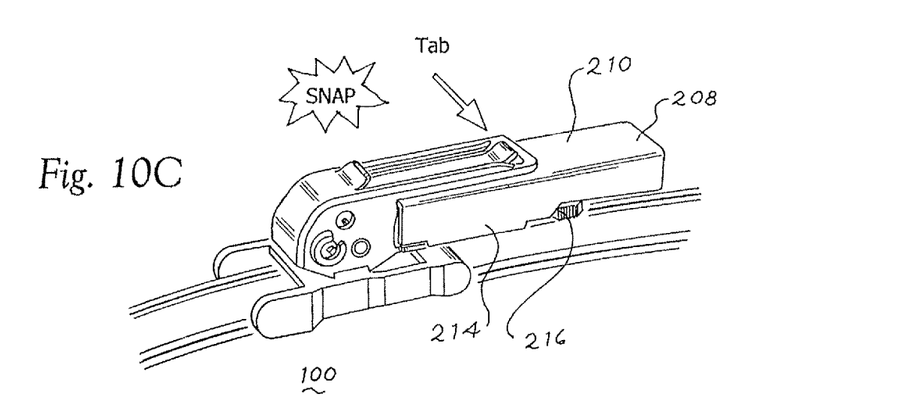

Once the top surface 210 of the PTB wiper arm 208 is inserted into the slot 140, the PTB wiper arm 208 is pushed further into the slot 140 toward the locking cap 106 until the protrusion 155 on the bottom surface of the engagement tongue 150 snaps into a rectangular opening 212 of the top surface 210 of the PTB wiper arm 208. When the snapping sound of insertion of the protrusion 155 through the opening 212 is heard, it signals that the PTB wiper arm 208 is attached to the connector 100. Note that during insertion of the PTB wiper arm 208 side flanges 214 engage lower edges 156 of the support surface 142. As shown in FIGS. 10A-C, the PTB wiper arm 208 has a U-type cross-section as defined by a top surface 210 and side flanges 214. When the wiper arm 208 is attached to the connector 100 by insertion of the top surface 210 into the rear opening 302, an upper face of the top surface 210 of the wiper arm 208 faces the under-sides of the engagement surface 144 and the engagement tongue 150. In addition, a lower face of the top surface 210 that is opposite to the upper face faces a top face of the support surface 142. Furthermore, upon attachment, the side flanges 214, which are substantially parallel to each other and are connected to and arranged on either side of the top surface 210 so as to be substantially perpendicular to the top surface 210, face exterior sides 304 of the side supports 146 and 148 of the engagement surface 144. In addition, at the locked position shoulders 216 of the PTB wiper arm 208 are trapped from going significantly in a direction away from the locking cap 106 by a pair of flexible wing stops 158 that face one another. The flexible wing stops 158 can be pressed towards one another along a direction that is perpendicular to a longitudinal axis of the slot 140.

Removal of the PTB wiper arm 208 that is locked in position is accomplished by pivoting upward a release notch 160 on the top surface of the engagement tongue 150. Such pivoting causes the protrusion 155 on the bottom surface of the engagement tongue 150 to be removed from the opening 212. At this stage, the PTB arm can be pulled out of the slot 140 once the flexible wing stops 158 are pressed towards one another.

Figure 11A:
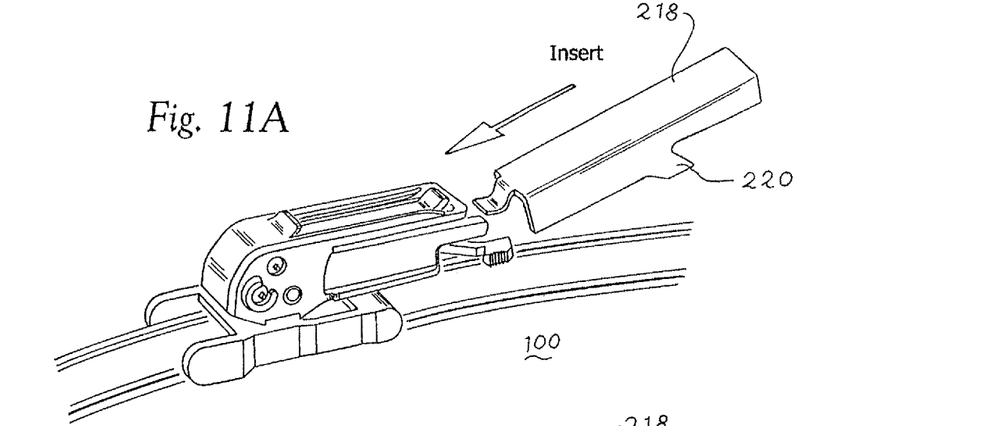
FIGS. 11A-C show a possible way of attaching a type of channel wiper arm, commonly known as an insert & lock (I & L) wiper arm, to the connector of FIGS. 1A-C.
Figure 11B:
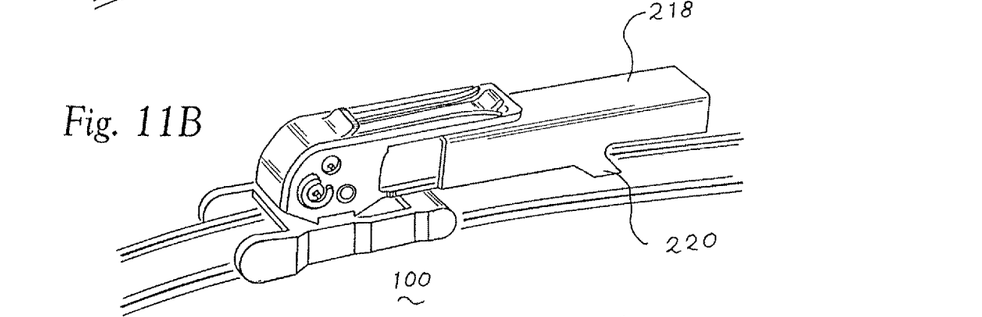
Figure 11C:
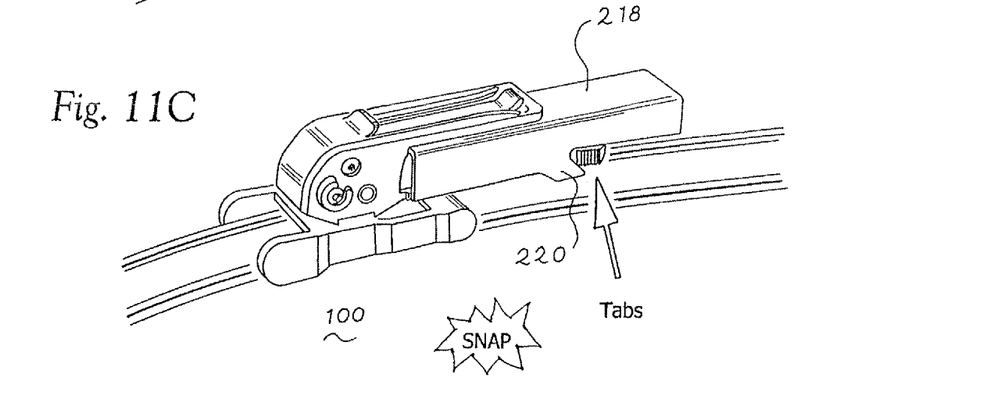

As shown in FIG. 11A, attachment of an I & L wiper arm 218 to the connector 100 is accomplished by first angling and aligning the distal end of the wiper arm 218 so that it will be inserted into the slot 140 and a channel defined between the side walls of the support surface 142. Such angling is needed so that a front edge of a curved portion 157 (see FIG. 8C) of the I & L wiper arm 218 can be freely inserted into the slot 140. Note that the slot 140 and the channel abut one another and are in fluid communication with one another with the channel being positioned nearer the locking cap 106 than the slot 140. Once the curved portion 157 is inserted into the slot 140, the I & L wiper arm 218 is pivoted downward and the top surface of the I & L wiper arm 218 is pushed into the slot 140 toward the locking cover 106 as shown in FIG. 11B. Pushing of the wiper arm 218 is continued until shoulders 220 ride over the top surfaces of the wing stops 158 and the shoulders 220 pass the wing stops 158. As shown in FIG. 11C, at this point the wing stops 158 snap behind the shoulders 220 thus preventing the I & L wiper arm from being moved out of the slot 140. At this point also, the curved portion 157 enters the channel and engages a shoulder of the receiving element 104 that has a shape complementary to the shape of the curved portion 157. When the snapping sound of insertion of the wing stops 158 is heard, it signals that the I & L wiper arm 218 is attached to the connector 100.

Removal of the I & L wiper arm 218 that is locked in position is accomplished by squeezing the wing stops 158 towards each other so as to allow the shoulders 220 to move past the wing stops 158 and away from the locking cover 106. With this configuration, the I & L wiper arm 218 can be removed from the slot 140.

Figure 8D:
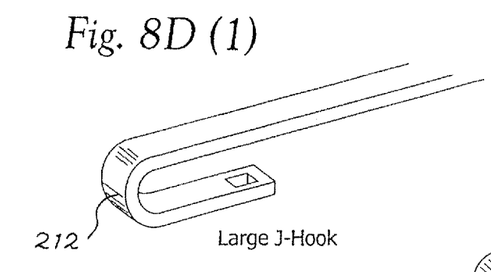

A third class of wiper arms that the connector 100 can be attached is J-hook wiper arms. Examples of such wiper arms are J-hook wiper arms 212, 214 of FIGS. 8D(1)-(2), wherein proximal ends of such pin arm wiper arms are shown. As is readily apparent from a comparison of J-hook wiper arms 212, 214, J-hook wiper arm 214 has a width that is smaller than that of the J-hook wiper arm 212. For such attachment, the locking cap or cover 106 is pivoted to an open position as shown in FIG. 1A.

Figure 12A:
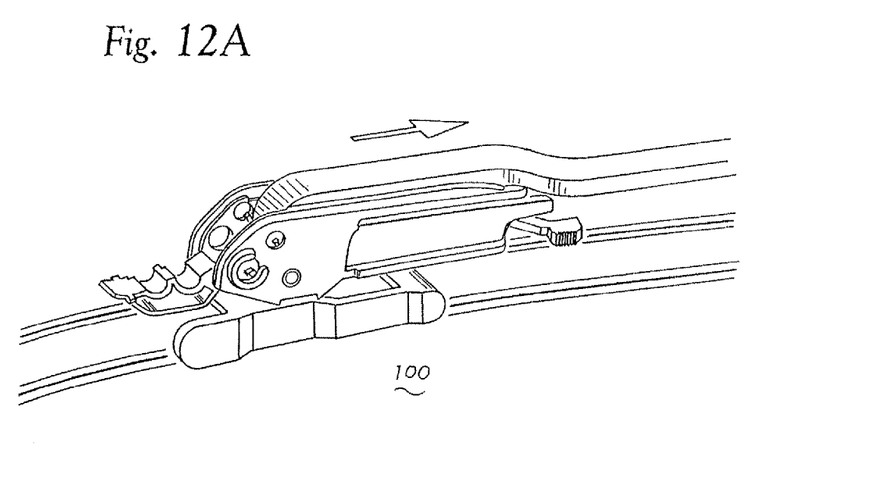
FIGS. 12A-B show a possible way of attaching a J-hook wiper arm to the connector of FIGS. 1A-C.
Figure 12B:
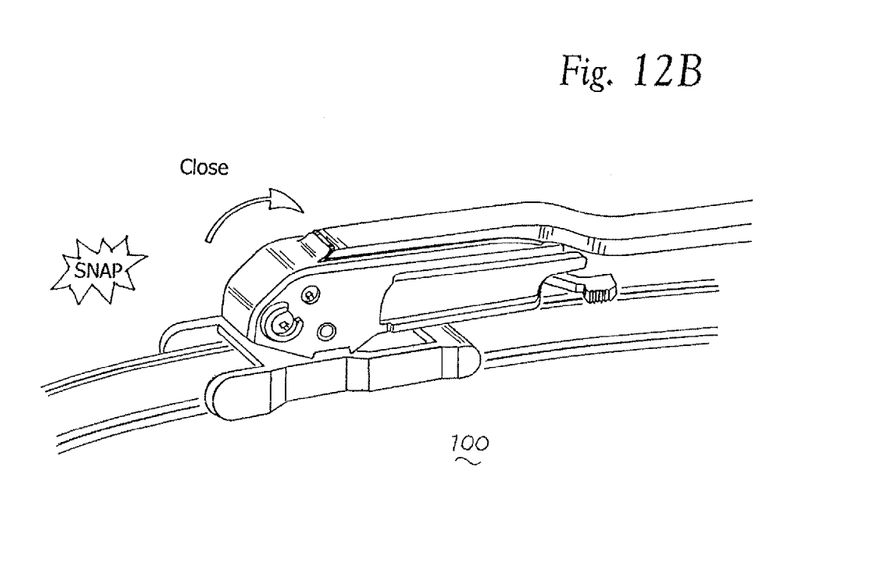
Figures 13A, 13B, 13C, 13D, 13E:
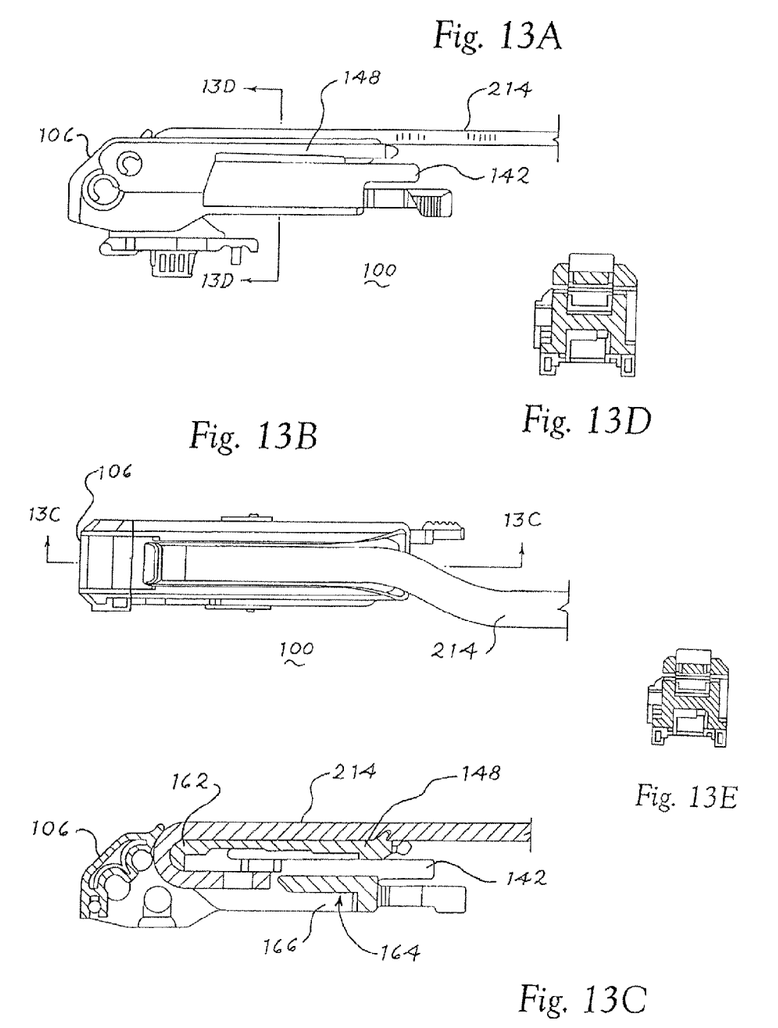

With the locking cap 106 in the open position, a J-hook wiper arm can be attached to the connector 100 via receiving element 104. The connector 100 can accommodate multiple sizes of J-hook wiper arms, such as the small and large J-hook wiper arms 212, 214 of FIG. 8D (1)-(2). This is accomplished in part by formation of a cavity defined in part by an end portion 162, the side walls 108, 110 and the support surface 142 as shown in FIG. 13C. As shown in FIG. 12A, attachment is achieved by inserting the free end of the J-hook wiper arm 212, 214 into the cavity and pulling away from the locking cap 106 (see FIG. 12A) until the curved portion of the J-hook wiper min 212, 214 snugly engages the end portion 162 as shown in FIG. 13C. At this position, the locking cap is snapped into the closed position shown in FIGS. 12B and 13A-C so that the J-hook wiper arm 212, 214 is locked in position. Note that in the case of the small J-hook wiper arm 214, the free end is positioned directly below the support surface 142 (see FIG. 13C). In the case of a large J-hook wiper arm 212, the free end will end up snugly engaging the bottom surface 164 of lower cavity 166 (see FIG. 13C). As mentioned previously, J-hook wiper arm 214 has a smaller width than J-hook wiper arm 212. Thus, when J-hook wiper arm 214 is inserted into the cavity there necessarily be is some space present so that the J-hook wiper arm 214 does not contact either the side wall 108 or the side wall 110 as schematically shown in FIG. 13E. Note that FIG. 13E is not being presented to define the orientation of the J-hook wiper arm 214, but merely to show that the J-hook wiper arm 214 has a width so that it could not touch both walls 108, 110.

It will be appreciated by those skilled in the art that changes could be made to the embodiments described above without departing from the broad inventive concept thereof. For example, the receiving element 104 previously described can be altered so it does not include structure for attaching J-hook wiper arms, but does include the previously recited structures for attaching of multiple pin wiper arms and multiple channel wiper arms, such as PTB and I & L wiper arms, as described in U.S. regular patent application Ser. No. 13/836,529 filed on Mar. 15, 2013, having the title "Connectors and Connector Kit for Attachment of a Windshield Wiper Blade to Multiple Types of Windshield Wiper Arms," the entire contents of which are incorporated herein by reference. It is understood, therefore, that this invention is not limited to the particular embodiments disclosed, but it is intended to cover modifications within the spirit and scope of the present invention as defined by the appended claims. In addition, design aspects of the connector 100 in whole or without the base 102 are possible.

We claim:

1. A connector for connecting a wiper blade and a wiper arm, the connector comprising:
    a base for attachment to said wiper blade;
    a receiving element pivotably and directly attached to said base, wherein said receiving element is arranged above said base as viewed along a vertical direction, said receiving element comprising:
        an attachment that pivotably couples said receiving element to said base;
        a recess structured to receive a first wiper arm;
        a pivot stop that is positioned adjacent to said recess, wherein when said first wiper arm is received by said recess, said pivot stop engages said first wiper arm and prevents said receiving element from pivoting relative to said base;
        a support surface comprising a pair of flexible wing stops that face one another and can be pressed towards one another;
        an engagement surface spaced from and facing said support surface as viewed along said vertical direction, wherein said engagement surface is substantially parallel to said support surface along an entire length of said engagement surface, said engagement surface and said support surface define a slot therebetween that is dimensioned to snugly receive a surface of a second wiper arm, and wherein said slot extends along a length of said engagement surface as viewed along a horizontal direction that is perpendicular to said vertical direction, and said support surface and said engagement surface define a side opening that is unencumbered by any portion of said receiving element when a first axis, which has no end points and is parallel to a lateral direction that is perpendicular to both said vertical direction and said horizontal direction, passes through said side opening and does not intersect said receiving element in any way, wherein said engagement surface comprises:
   a first side support;
   a second side support that faces said first side support; and
   an engagement tongue, wherein one end of said engagement tongue is attached to both said first side support and said second side support and an opposite end of said engagement tongue is unattached and has a protrusion that faces said support surface; and
wherein a rear opening of said slot is defined by said first side support, said second side support and said support surface and wherein said rear opening is perpendicularly intersected by a second axis that is perpendicular to and intersects said first axis and extends towards said rear opening without intersecting said receiving element in any way.

2. The connector of claim 1, wherein said first side support and said second side support move independently of said engagement tongue and vice versa.

3. The connector of claim 1, wherein said engagement tongue comprises a release notch that is located on a side opposite of said protrusion.

4. The connector of claim 1, wherein said pair of flexible wing stops can be pressed towards one another along a direction that is perpendicular to a longitudinal axis of said slot.

5. The connector of claim 1, wherein said pivot stop is integral with said base.

6. The connector of claim 1, wherein said receiving element has a structure to receive and be connected to at least six different wiper arms.

7. The connector of claim 6, wherein said at least six different wiper arms are an I & L wiper arm, a PTB wiper arm, a first pin wiper arm, a second pin wiper arm, a first J-hook wiper arm and a second J-hook wiper arm.

8. The connector of claim 6, wherein said at least six different wiper arms comprise at least three different classes of wiper arms.

9. The connector of claim 1, wherein said receiving element comprises a cap that has an indent, wherein said cap pivots from an open position to a closed position, wherein at said closed position, said indent engages said wiper arm received by said recess.

10. The connector of claim 1, wherein said receiving element comprises a second recess to receive a wiper al iii and wherein said receiving element comprises a cap that has a pair of indents, wherein said cap pivots from an open position to a closed position, wherein at said closed position, said indent engages said wiper arm received by either said recess or said second recess.

11. A windshield wiper comprising:
   a wiper blade;
   a wiper arm;
   a connector attached to said wiper arm comprising:
      a base attached to said wiper blade;
      a receiving element pivotably and directly attached to said base, wherein said receiving element is arranged above said base as viewed along a vertical direction, said receiving element comprising:
         an attachment that pivotably couples said receiving element to said base;
         a recess structured to receive a first wiper arm;
         a pivot stop that is positioned adjacent to said recess, wherein when said first wiper arm is received by said recess, said pivot stop engages said first wiper arm and prevents said receiving element from pivoting relative to said base;
         a support surface comprising a pair of flexible wing stops that face one another and can be pressed towards one another;
         an engagement surface spaced from and facing said support surface as viewed along said vertical direction, wherein said engagement surface is substantially parallel to said support surface along an entire length of said engagement surface, said engagement surface and said support surface define a slot therebetween that is dimensioned to snugly receive a surface of a second wiper arm, and wherein said slot extends along a length of said engagement surface as viewed along a horizontal direction that is perpendicular to said vertical direction, and said support surface and said engagement surface define a side opening that is unencumbered by any portion of said receiving element when a first axis, which has no end points and is parallel to a lateral direction that is perpendicular to both said vertical direction and said horizontal direction, passes through said side opening and does not intersect said receiving element in any way, wherein said engagement surface comprises:
            a first side support;
            a second side support that faces said first side support; and
            an engagement tongue, wherein one end of said engagement tongue is attached to both said first side support and said second side support and an opposite end of said engagement tongue is unattached and has a protrusion that faces said support surface; and
         wherein a rear opening of said slot is defined by said first side support, said second side support and said support surface and wherein said rear opening is perpendicularly intersected by a second axis that is perpendicular to and intersects said first axis and extends towards said rear opening without intersecting said receiving element in any way.

12. The windshield wiper of claim 11, wherein said first side support and said second side support move independently of said engagement tongue and vice versa.

13. The windshield wiper of claim 11, wherein said engagement tongue comprises a release notch that is located on a side opposite of said protrusion.

14. The windshield wiper of claim 11, wherein said pair of flexible wing stops can be pressed towards one another along a direction that is perpendicular to a longitudinal axis of said slot.

15. The windshield wiper of claim 11, wherein said pivot stop is integral with said base.

16. The windshield wiper of claim 11, wherein said receiving element has a structure to receive and be connected to at least six different wiper arms.

17. The windshield wiper of claim 16, wherein said at least six different wiper arms are an I & L wiper arm, a PTB wiper arm, a first pin wiper arm, a second pin wiper arm, a first J-hook wiper arm and a second J-hook wiper arm.

18. The windshield wiper of claim 16, wherein said at least six different wiper arms comprise at least three different classes of wiper arms.

19. The windshield wiper of claim 11, wherein said receiving element comprises a cap that has an indent, wherein said cap pivots from an open position to a closed position, wherein at said closed position, said indent engages said wiper arm received by said recess.

20. The windshield wiper of claim 11, wherein said receiving element comprises a second recess to receive a wiper arm and wherein said receiving element comprises a cap that has a pair of indents, wherein said cap pivots from an open position to a closed position, wherein at said closed position, said indent engages said wiper arm received by either said recess or said second recess.

21. The windshield wiper of claim 11, wherein said wiper arm is said first wiper arm.

22. The windshield wiper of claim 11, wherein said wiper arm is said second wiper arm.

* * * * *